United States Patent [19]

Küschall

[11] Patent Number: 4,682,783

[45] Date of Patent: Jul. 28, 1987

[54] WHEEL CHAIR

[75] Inventor: Rainer Küschall, Basel, Switzerland

[73] Assignee: Paratec AG, Basel, Switzerland

[21] Appl. No.: 542,655

[22] Filed: Oct. 17, 1983

[30] Foreign Application Priority Data

Oct. 20, 1982 [CH] Switzerland ........................ 6097/82

[51] Int. Cl.[4] ........................ A47C 4/28; A61G 5/02; B62M 1/14

[52] U.S. Cl. ............................ 280/242 WC; 297/45; 297/DIG. 4

[58] Field of Search ............... 280/242 WC, 289 WC; 297/45, 42, 44, DIG. 4; 16/18 A, 19

[56] References Cited

U.S. PATENT DOCUMENTS

| | | | |
|---|---|---|---|
| 909,411 | 1/1909 | Hockney | 297/45 |
| 4,428,594 | 1/1984 | Minnebraker | 280/242 WC |

FOREIGN PATENT DOCUMENTS

| | | | |
|---|---|---|---|
| 2903196 | 7/1980 | Fed. Rep. of Germany | 297/44 |
| WO81/01365 | 5/1981 | PCT Int'l Appl. | 280/242 WC |
| 681490 | 10/1952 | United Kingdom | 297/45 |

*Primary Examiner*—John J. Love
*Assistant Examiner*—Mitchell J. Hill
*Attorney, Agent, or Firm*—Marmorek, Guttman & Rubenstein

[57] ABSTRACT

A foldable wheelchair, which may be moved along a predetermined direction of movement, includes first and second side frames, drive wheels and travelling wheels rotatably supported on the side frames, and a folding mechanism which extends between the side frames, which can be moved between a folded position and an unfolded position, and which, in turn, includes first and second pivoting devices. Each pivoting device may be pivoted about a respective center axis, which extends approximately along the direction of movement, and each pivoting device has ends facing away from its respective center axis. Each side frame defines first and second pivot axes, which extend substantially parallel to the center axes. The ends of the first pivoting device are pivotable about corresponding of the first pivot axes, and the ends of the second pivoting device are pivotable about corresponding of the second pivot axes. The center axis of the first pivoting device, and the first pivot axes are substantially aligned in a first plane, and the center axis of the second pivoting device, and the second pivot axes are substantially aligned in a second plane, when the folding mechanism is in the unfolded position. The pivoting devices may be arrested in the unfolded position, thereby rigidly connecting the side frames to one another.

25 Claims, 6 Drawing Figures

WHEEL CHAIR

BACKGROUND OF THE INVENTION

The invention relates to a foldable wheelchair with lateral frames, on which there are supported drive- and travelling wheels, and folding means, such as a folding mechanism pivoted on a rotation axle disposed betwen the frames in a direction of travel.

Such foldable wheelchairs are intended for persons whose walking is impaired, sick persons, persons paralyzed in mid-section etc. In a known wheelchair of this type (DE-OS No. 1 943 339) the folding mechanism consists of cross-connected connecting rods and movable at the crossing point about the rotation axis in a scissor-like manner. So that all wheels may remain on the ground on moving across uneven terrain surfaces, this known wheelchair lacks a rigid connection between both frames. For this purpose the connecting rods are not only articulatably supported on the corresponding frame, but additional telescopically formed joints are provided, to permit transverse displacements between the connecting rods and the crossing point, when the wheelchair travels over uneven terrain. These articulated joints must have a high stability and be able to change their position continuously about their longitudinal axis, for which reasons additional spring elements are required. In a further known wheelchair (FR-OS No. 2 359 601) the vertical frame parts are formed telescopically for this purpose, and are also provided with spring elements.

This construction of known wheelchairs has led to the fact that these have today a weight of at least 20 kg, and that based on their expensive construction it is practically impossible to fall below this minimum weight. Furthermore these known wheelchairs convey a spongy travel feeling, because they are twistable within themselves during travel on uneven terrain in all directions, based on the large number (at least twenty) of joints, which makes the wheel chair traveller miss the correct contact with the terrain, on which he just happens to travel. Furthermore the known wheelchairs, based on the multiplicity of their joint connections, and their consequently unavoidably complicated construction, are subject to a strong wear, which causes in turn a considerable maintenance-and-repair-effort.

SUMMARY OF THE INVENTION

It is an object of the present invention to devise a wheelchair, which is in itself more stable, permits a more certain travel feeling, is more compact, and has a considerably lower weight and a considerably simpler construction than known wheelchairs.

This object is attained, according to the invention, by the folding mechanism consisting of two frame joints, which are each pivoted, with their ends facing away from the frame joint rotation axle, on one or the other frame on a pivoting axle spaced from and parallel to the pivoting rotation axle, and which, in the unfolded position, wherein, for each frame joint, the frame joint rotation axle and the pivoting axles are aligned with one another, are arrestable for rigid connection of the frames to one another. The wheelchair according to the invention includes only six joints with respect to the state-of-the-art (with respectively one degree of freedom), and in the unfolded and arrested state of both frame joints the wheelchair is a rigid structure within itself. Based on this very simple construction a considerable weight reduction of the wheelchair has been achieved (about 11 kg with respect to the minimum weight of 20 kg in the state-of-the-art). Due to the considerable weight reduction the wheelchair, according to the invention, could also be implemented functionally considerably more simply than known wheelchairs. For in the wheelchair, according to the invention, all movable, slideable, and guidable parts within the cross-scissor arrangement according the state-of-the-art could be dispensed with. The wheelchair rigid within itself, when the frame joints are unfolded, conveys to the traveller a considerably more certain travel feeling than known wheelchairs. The compact construction and the considerably lower weight result in an extremely simple handleability. By the considerable reduction of the number of joints (only six) and of the connecting rods, and dispensing completely with spring elements, the maintenance- and repair effort is smaller by a multiple than in known wheelchairs.

Further developments of the invention are discussed hereinafter.

In one embodiment of the invention there results a very simple and weight-saving construction of the frames, as these consist merely of a frame corner part below the seating surface and of a frame leg leading to the footrest of the wheelchair.

In a further development of the invention the wheelchair can be brought in a simple manner into the operative position, namely into the unfolded state, by the frame joints being merely unfolded until a stop is reached.

In still another development of the invention the wheelchair can be transformed in a simple manner into a rigid structure.

In a further development of the invention the frame joint axles of both frame joints are not parallel to one another, so that in the case of the frame joints being unfolded up to the stop, the operative position of the wheelchair remains securely maintained, both in the arrested and non-arrested state thereof, even when impacts from an arbitrary direction act on the wheelchair.

In still another development of the invention the frames are simply die casting parts, which considerably simplifies the manufacture.

In a further development of the invention, by anchoring of the axles of the drive wheels in different hole combinations, the wheelchair can be matched to the travelling attitude of different wheelchair owners (for example according to their weight, and position of the center of gravity).

In still another development of the invention the lower frame joint is formed as a footrest, which contributes considerably to weight reduction.

In a further development of the invention the frames are held in a defined mutual relation, for which only two frame joints or six joints or points of rotation are required.

A still further development of the invention results in a considerable simplification of the manufacture of the wheelchair.

In another development of the invention, there results, according to the invention, a particularly simple, weight-saving and cost-effective construction of the wheelchair during manufacture.

BRIEF DESCRIPTION OF THE DRAWING

An embodiment example of the invention is now described in what follows in more detail by reference to the drawings in which.

DESCRIPTION OF THE PREFERRED EMBODIMENTS

Figure 1:
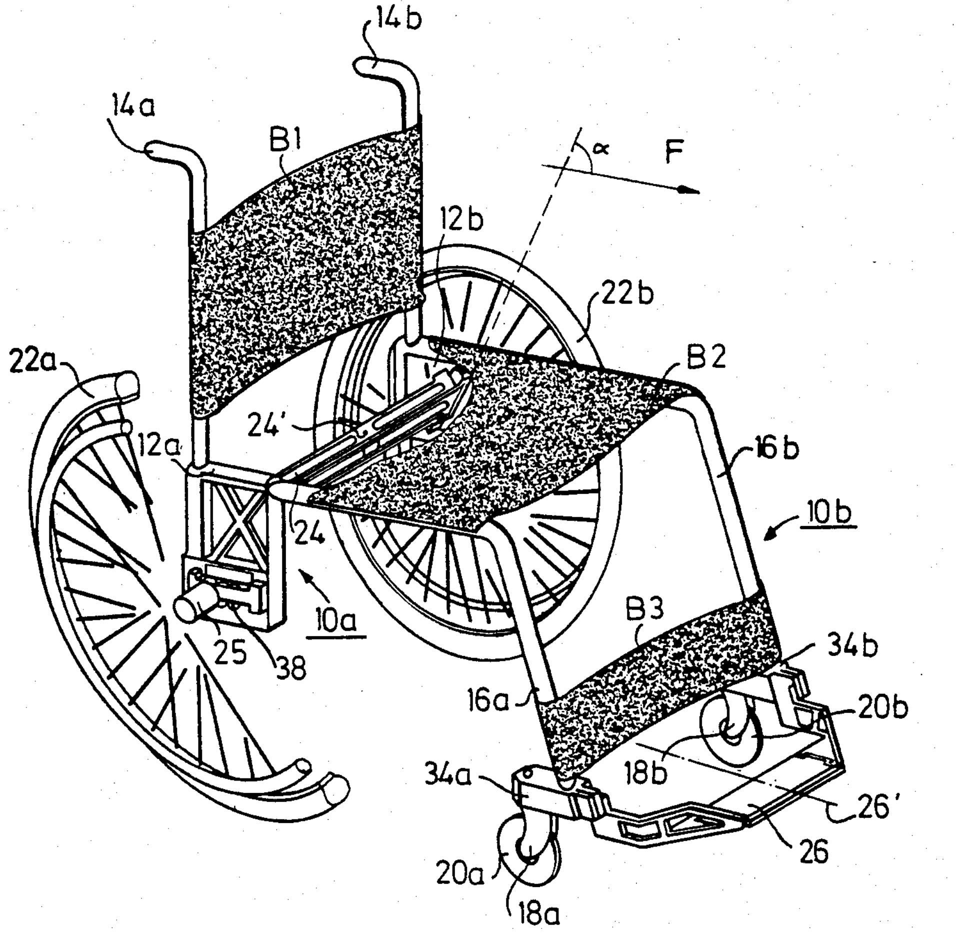
FIG. 1 is a perspective view of the wheelchair according to the invention.
Figure 2:
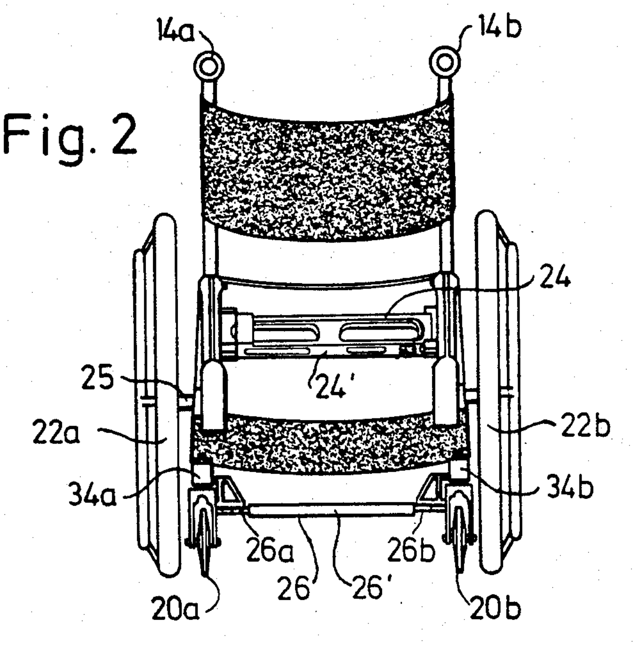
FIG. 2 is an elevation view of the wheelchair of FIG. 1.
Figure 3:
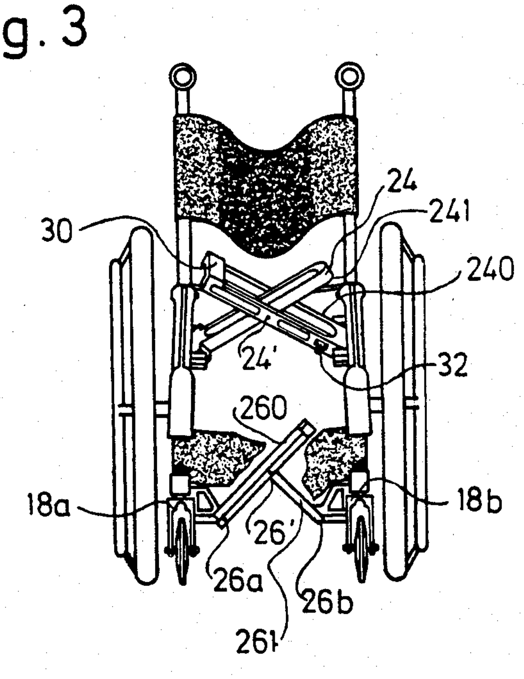
FIG. 3 is the same view of the wheelchair as in FIG. 2, but in a partly folded state.

According to FIGS. 1–3 the foldable wheelchair consists of two lateral or side frames denoted in their entirety by 10*a* and 10*b*. Each frame consists of a frame corner part or frame corner member 12*a* and 12*b*, to which tubular handles 14*a* or 14*b* have been secured thereabove for sliding the wheelchair, and of a frame leg 16*a* and 16*b*, each frame leg including a segment extending approximately parallel to the direction of travel, which in turn is secured with one end thereof to the corner frame part, and with the other end thereof changes over into a downwardly bent section, which leads to a support 34*a* and 34*b* of a rotatable wheel holder 18*a* and 18*b*. Travelling wheels 20*a* and 20*b* are supported on the rotatable wheel holders. The drive wheels 22*a*, 22*b* are adjustably anchored with their wheel axles 25 in the corner frame parts 12*a* and 12*b*. Between the tubular handles 14*a*, 14*b* there is attached a fabric B1 as a backrest. Between the upper segments of the frame legs 16*a*, 16*b* there is attached a fabric B2 as a seating surface. Between the lower segments of the frame legs 16*a*, 16*b* there is attached a fabric B3, which the lower calves of the wheelchair traveller can abut.

The frame corner parts 12*a*, 12*b* are preferably formed as diecast parts. The folding mechanism of the wheelchair consists of pivoting means, such as two frame joints 24, 26, which, with their ends facing away from the frame joint rotation axle or center axis are pivoted on the frames 10*a* and 10*b* along a pivoting axle or pivoting axis 24*a*, 24*b*, or 26*a*, 26*b* which is parallel to the frame joint rotation axle.

Figure 4:
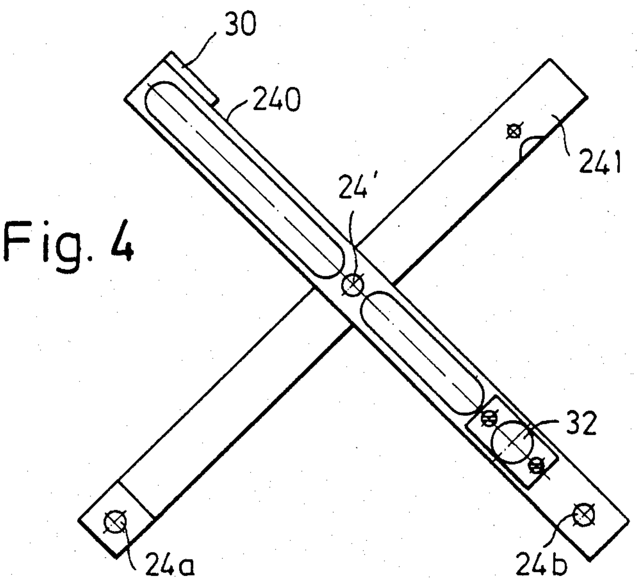
FIG. 4 is a sideview of the upper frame joint of the folding mechanism in a partly folded state.
Figure 5:
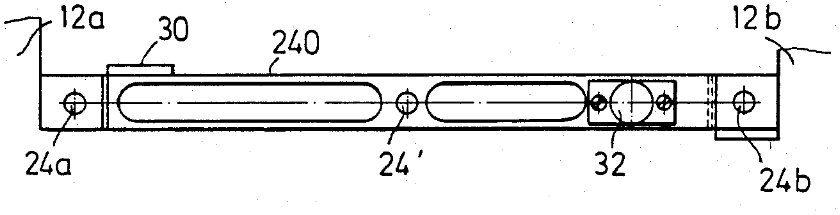
FIG. 5 is an elevation view of the frame joint in FIG. 4 in the unfolded state.
Figure 6:
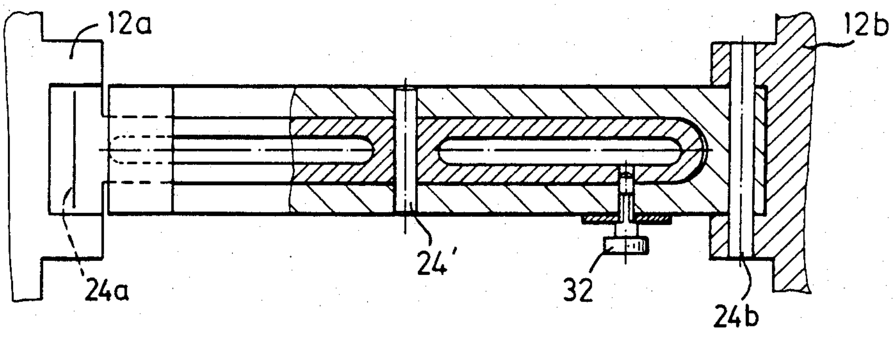
FIG. 6 is a plan view in part section of the frame joint of FIG. 5.

According to FIGS. 4 to 6 the upper frame joint 24 consists of two rods or bars 240, 241 foldable towards one another around the frame joint rotation axle 24', whose pivoting axles 24*a* and 24*b* are implemented by pins, which are anchored in the frame corner parts 12*a* and 12*b*. The position of the frame joint rotation axle 26' of the lower frame joint 26, and of the pivoting axles 26*a* and 26*b* thereof is ascertained from the illustration in FIG. 3. According to the representation in FIG. 1, the frame joint pivoting axle 26' of the frame joint 26 extends approximately parallel to the direction of travel F, while the frame joint pivoting axle 24' of the upper frame joint forms an angle $\alpha$ with the travelling direction F, which is preferably about 45°. The angle relation of the frame joint rotation axles contributes to the stability of the wheelchair in the unfolded state.

According to FIGS. 4 to 6 the rod 240 is provided with stop means, such as a stop device implemented as a crossrod on the end thereof facing away from the pivoting axle 24*b*. The rod 241 is pivotably disposed within the rod 240. In the unfolded state (FIGS. 5 and 6) the crossrod 30 abuts the rod 241. Due to the weight of a wheelchair traveller acting on the seating surface B2 the wheelchair is sufficiently arrested in itself in the unfolded state. But an additional arresting means, such as an arresting device 32 is advantageously provided (FIG. 6), which relates to a resiliently supported bolt in a throughpassing bore in the rod 240, which borders a corresponding bore of the rod 241.

The lower frame joint 26 is essentially of the same construction as the upper frame joint 24. The difference is primarily due to the rod 261 reaching only up to the frame joint rotation axle 26', and that the lower rod 260 is devoid of any recess on its upper side, so that the lower frame joint can be implemented as a footrest, which can be ascertained easily from FIG. 1. The rotatable wheel holders 18*a*, 18*b* are pivotable about the supports 34*a* and 34*b* respectively about vertical axes. The pivoting axles 26*a* and 26*b* of the lower frame joint 26 are connected to these supports (FIG. 3). The wheel axles of the two driving wheels 20*a* and 20*b* are connected to the corresponding wheelholders 18*a* and 18*b*. The wheelholders 18*a* and 18*b*, in turn, are supported in the respective supports 34*a* and 34*b* at a changeable angle (not illustrated in the Figures) so as to be able to equalize any change in inclination of the seating surface B2.

It is similarly provided to anchor the wheel axles of the drive wheels 22*a*, 22*b* in pairwise aligned holes 38, of which a plurality is provided on each frame corner part 12*a*, 12*b*, as has been indicated in FIG. 1. The wheelchair can thus be matched to the center of gravity of drivers of different weights, by the wheel axles 25 being unthreaded, fitted into new holes, and again being threaded thereonto.

Although the wheel frame parts 12*a*, 12*b*, and the frame legs 16*a*, 16*b*, are implemented in the example described as casting- or die-cast parts or tubes, the frame legs can, however, also be implemented as casting- or die cast parts, which are manufactured in one piece with the frame corner parts, or are manufactured separately. In any case all frame parts are implemented as rotation- and torsionstiff profile parts.

In order to use the wheelchair, it is merely unfolded from the folded position (not illustrated), through intermediate positions, of which one is shown in FIG. 3 by way of an example, into the unfolded position, which is shown in FIG. 2, until the crossrod 30 abuts the rod 241, and wherein thereafter the other frame joint 26 unfolds. In the case of need the upper frame joint 24 of the wheelchair—which in this position is by itself already rigid—can still be arrested by means of the releasable arresting device 32 (FIG. 6).

The invention does not, however, relate only to the previously described embodiment example, but can be utilized in all different wheelchair constructions. For example the two handle tubes 14*a* and 14*b* can merely be provided for receiving the fabric B1, and actual handles can be dispensed with.

Furthermore the gripping tubes 14*a* and 14*b* can be connected through a corresponding arresting device to the frame corner parts 12*a* and 12*b*, so as to be rotatably movable thereon, so that the entire backrest with its fabric B1 may be folded towards the fabric B2 of the seating surface. By such measures a further reduction in dimensions of the folded wheelchair is obtainable.

I claim:

1. A foldable wheelchair movable along a predetermined direction of movement,
comprising in combination
first and second side frames,
drive wheels and travelling wheels rotatably supported on said side frames, and
folding means extending between said side frames, movable between a folded position and an unfolded position, and including
first and second pivoting means, said first and second pivoting means each including two rods, said rods of said first pivoting means being substantially U-shaped, said rods of said first and second pivoting means being pivotable towards one another in a scissor-like manner about a respective center axis extending approximately along said direction of movement, each pivoting means having ends facing away from its respective center axis, and
at least one stop means operative in the unfolded position of said folding means, said stop means being encountered by at least one of said rods, said stop means including at least one crossbar secured to both sides of one rod at an end thereof remote from said respective center axis so as to abut in the unfolded position of said folding means onto the other of said rods,
each side frame defining first and second pivot axes, extending substantially parallel to said center axes,
the ends of said first pivoting means being pivotable about corresponding of said first pivot axes, and the ends of said second pivoting means being pivotable about corresponding of said second pivot axes,
said center axis of said first pivoting means and said first pivot axes being substantially aligned in a first plane, said center axis of said second pivoting means and said second pivot axes being substantially aligned in a second plane when said folding means is in said unfolded position,
said pivoting means being arrestable in said unfolded position, thereby rigidly connecting said side frames to one another.

2. The foldable wheelchair as claimed in claim 1, wherein said drive wheels are supported on said side frames at a certain level, and wherein said folding means further includes a foldable fabric extending between said side frames and defining a seating surface in said unfolded position, and wherein each side frame includes a frame corner member, and a leg facing away from said frame corner member and rigidly connected therewith, one of said pivoting means being connected below said seating surface to said frame corner members, the other of said pivoting means being connected to said legs approximately at the level of said travelling wheels.

3. The foldable wheelchair as claimed in claim 1, wherein at least one of said pivoting means includes releasable arresting means, said rods of said one of said pivoting means means being rigidly connected to one another in said unfolded position of said folding means by said arresting means.

4. The foldable wheelchair as claimed in claim 1, wherein the center axis of one of said pivoting means subtends an angle of about 45 degrees with said direction of movement, while the center axis of the other of said pivoting means extends approximately parallel with said direction of movement.

5. The foldable wheelchair as claimed in claim 2, wherein said frame corner members are die cast parts, and said legs are tubes, and wherein one frame corner member and one leg form a complete side frame.

6. The foldable wheelchair as claimed in claim 2, wherein each drive wheel includes an axle, and wherein each frame corner member has holes operatively disposed along said direction of movement, corresponding holes in opposite frame corner members being pairwise aligned for selectable anchoring of said axles.

7. The foldable wheelchair as claimed in claim 2, wherein the pivoting means disposed at the level of said drive wheels form a footrest.

8. The foldable wheelchair as claimed in claim 1, wherein said folding means further comprises intermediate positions, and wherein said side frames are aligned with one another in said folded, in said unfolded, and in said intermediate positions, and are substantially parallel with one another.

9. The foldable wheelchair as claimed in claim 1, wherein each side frame includes a generally horizontally rotatable support, said travelling wheels being supported in said horizontally rotatable supports.

10. The foldable wheelchair as claimed in claim 9, wherein said rotatable supports are castings.

11. The foldable wheelchair as claimed in claim 9, wherein said rotatable supports are die cast supports.

12. The foldable wheelchair as claimed in claim 2, wherein said frame corner members and said legs are torsion-resistant and rotation-resistant profile members.

13. A foldable wheelchair movable along a predetermined direction of movement,
comprising in combination
first and second side frames,
drive wheels and travelling wheels rotatably supported on said side frames, and
folding means extending between said side frames, movable between a folded position and an unfolded position, and including
first and second pivoting means, each being pivotable about a respective center axis extending approximately along said direction of movement, each pivoting means having ends facing away from its respective center axis,
each side frame defining first and second pivot axes, extending substantially parallel to said center axis,
the ends of said first pivoting means being pivotable about corresponding of said first pivot axes, and the ends of said second pivoting means being pivotable about corresponding of said second pivot axes,
said center axis of said first pivoting means and said first pivot axes being substantially aligned in a first plane, said center axis of said first pivoting means subtending an angle of about 45 degrees with the direction of movement, said center axis of said second pivoting means and said second pivot axes being substantially aligned in a second plane when said folding means is in said unfolded position, said center axis of said second pivoting means extending approximately parallel with said direction of movement,
said pivoting means being arrestable in said unfolded position, thereby rigidly connecting said side frames to one another.

14. The foldable wheelchair as claimed in claim 13, wherein said drive wheels are supported on said side frames at a certain level, and wherein said folding means further includes a foldable fabric extending between said side frames and defining a seating surface in said unfolded position, and wherein each side frame includes a frame corner member, and a leg facing away from said frame corner member and rigidly connected therewith, one of said pivoting means being connected below said seating surface to said frame corner members, and the other of said pivoting means being connected to said legs approximately at the level of said travelling wheels.

15. The foldable wheelchair as claimed in claim 13, wherein each pivoting means includes two rods pivotable towards one another in a scissor-like manner around a corresponding center axis, a stop means operative in the unfolded position of said folding means being encountered by at least one of said rods.

16. The foldable wheelchair as claimed in claim 15, wherein said stop means includes at least one transverse member secured to one rod at an end thereof remote from said corresponding center axis so as to abut in the unfolded position of said folding means onto the other rod.

17. The foldable wheelchair as claimed in claim 15, wherein at least one of said pivoting means includes releasable arresting means, said rods of said one of said pivoting means being rigidly connected to one another in said unfolded position of said folding means by said arresting means.

18. The foldable wheelchair as claimed in claim 14, wherein said frame corner members are die cast parts, and said legs are tubes, and wherein one frame corner member and one leg form a complete side frame.

19. The foldable wheelchair as claimed in claim 15, wherein each drive wheel includes an axle, and wherein each frame corner member has holes operatively disposed along said direction of movement, corresponding holes in opposite frame corner members being pairwise aligned for selectable anchoring of said axles.

20. The foldable wheelchair as claimed in claim 14, wherein the pivoting means disposed at the level of said drive wheels form a footrest.

21. The foldable wheelchair as claimed in claim 13, wherein said folding means further comprises intermediate positions, and wherein said side frames are aligned with one another in said folded, in said unfolded, and in said intermediate positions, and are substantially parallel with one another.

22. The foldable wheelchair as claimed in claim 13, wherein each side frame includes a generally horizontally rotatable support, said travelling wheels being supported in said horizontally rotatable supports.

23. The foldable wheelchair as claimed in claim 22, wherein said rotatable supports are castings.

24. The foldable wheelchair as claimed in claim 22, wherein said rotatable supports are die cast supports.

25. The foldable wheelchair as claimed in claim 14, wherein said frame corner members and said legs are torsion-resistant and rotation-resistant profile members.

* * * * *